United States Patent
Ahrens et al.

Patent Number: 6,128,927
Date of Patent: Oct. 10, 2000

[54] METHOD OF MAKING FERRULE CONNECTORS FOR OPTICAL FIBERS

[75] Inventors: Robert George Ahrens, Chatham; Herman Melvin Presby, Highland Park, both of N.J.

[73] Assignee: Lucent Technologies Inc., Murray Hill, N.J.

[21] Appl. No.: 09/128,497

[22] Filed: Aug. 3, 1998

[51] Int. Cl.[7] ................................................. C03B 40/00
[52] U.S. Cl. ................... 65/392; 65/404; 65/393; 65/412; 65/23; 65/108
[58] Field of Search ........................... 65/393, 404, 407, 65/392, 412, 23, 108

[56] References Cited

U.S. PATENT DOCUMENTS

| | | | |
|---|---|---|---|
| 1,815,146 | 7/1931 | Erber | 65/23 |
| 2,072,194 | 3/1937 | Anastor | 65/23 |
| 2,084,811 | 6/1937 | Keen | 65/23 |
| 3,091,104 | 5/1963 | Morrill | 65/23 |
| 3,091,105 | 5/1963 | Morrill | 65/23 |
| 4,028,082 | 6/1977 | Krohn | 65/23 |
| 4,696,538 | 9/1987 | Despouys | 350/96.2 |
| 4,750,926 | 6/1988 | Berkeg | 65/412 |
| 4,815,809 | 3/1989 | Szostak | 350/96.2 |
| 4,869,745 | 9/1989 | Flaming . | |
| 4,921,522 | 5/1990 | Flaming . | |
| 5,212,746 | 5/1993 | Miller et al. | 385/25 |
| 5,481,634 | 1/1996 | Anderson et al. | 385/76 |
| 5,598,496 | 1/1997 | Anderson et al. | 385/84 |
| 5,668,905 | 9/1997 | Takahashi et al. | 385/78 |
| 5,720,907 | 2/1998 | Anderson et al. | 264/1.25 |

FOREIGN PATENT DOCUMENTS

| | | | |
|---|---|---|---|
| 61-40832 | 2/1986 | Japan | 65/404 |

*Primary Examiner*—John Hoffmann
*Attorney, Agent, or Firm*—Robert E. Rudnick; Patricia A. Verlangieri; John M. Harman

[57] ABSTRACT

A method for controlling a bore diameter of an optical fiber ferrule is disclosed. The diameter of the bore is controlled by collapsing the ferrule around a rod inserted in an over-sized bore formed therein. The diameter of the rod is selected to match the diameter of the optical fiber to be supported by the ferrule. Thus, after the rod is subsequently immersed in liquid nitrogen removed from the ferrule, the ferrule has a bore diameter which is defined by the diameter of the rod. Suitable materials for the ferrule and the rod include glass and metal, respectively.

17 Claims, 3 Drawing Sheets

METHOD OF MAKING FERRULE CONNECTORS FOR OPTICAL FIBERS

FIELD OF THE INVENTION

The present invention relates to optical fiber ferrule assemblies, and more particularly, to ferrule assemblies suitable for aligning an optical fiber with an optical device.

DESCRIPTION OF THE RELATED ART

Most optical communication arrangements require, at some point, the coupling of an optical fiber to an optical device such as a laser, a light emitting diode (LED), a photodiode, or another optical fiber. In many optical communication arrangements, an end portion of the optical fiber is enclosed within a housing, called a ferrule. The ferrule provides support for the end portion of the optical fiber making such enclosed optical fibers easier to pick up and/or handle as well as generally forming part of an optical fiber connector.

A cut away view of a ferrule 10 useful for supporting the end portion of the optical fiber is shown in FIG. 1A. The ferrule 10 has an elongated body 15 with a bore 20 extending axially therethrough. A portion of one end 17 of the ferrule 10 is beveled. The beveled end makes it easier to align the ferrule with a connector for another optical device. Typically, the beveled portion of the ferrule has a length that is less than about 1/10th the length of the ferrule.

An optical fiber 23 is inserted into the bore 20 so it protrudes from the beveled end 17 of the ferrule 10, as shown in the cut away view of FIG. 1B. The protruding end of the optical fiber 23 is then cleaved and the beveled end 17 of the ferrule 10 is prepared for coupling with an optical device or another connector (not shown). The beveled end 17 of the ferrule 10 is prepared for coupling with the optical device by grinding and polishing the optical fiber 23 to provide a flat end face 25 that is flush with the beveled end 17 of the ferrule 10, as shown in the cut away view of FIG. 1C.

The bore 20 which extends axially through the ferrule 10 has an axis, denoted as 30 in FIG. 1C. The axis 30 identifies the mid-point for both the diameter of the bore 20 and the diameter of the optical fiber ferrule 10. Additionally, the bore 20 is fabricated to have a diameter which matches the diameter of the particular optical fiber that is to be inserted therein. It is important that the bore 17 has an axis located at the mid-point of the diameter of the optical fiber ferrule as well as a diameter which matches the diameter of the optical fiber, so the axis of the optical fiber aligns with the axis of the bore, and thus the axis of the optical fiber ferrule. The axis of the optical fiber identifies the mid-point of the diameter for such optical fiber, also denoted as 30 in FIG. 1C.

Misalignment between the axes of the ferrule and the optical fiber inserted therein, potentially creates coupling losses when the optical fiber is coupled with other optical devices. For example, misalignments between the axes of the optical fiber and the ferrule that are greater than about 1 $\mu$m (micron) potentially generate coupling losses greater than about 0.1 dB for two single-mode optical fibers coupled together (assuming the second optical fiber and ferrule have a common axis). Coupling losses greater than about 0.1 dB are undesirable because such losses reduce the transmission capabilities of optical signals transmitted between optical fibers.

Many ferrules useful for supporting the end portion of the optical fiber are made of ceramic materials. Ceramic ferrules are typically made with a molding process. In the molding process, a mold having the exact dimensions of the ferrule (outside diameter and bore diameter) is filled with ceramic material which is then hardened. While molding processes produce bores in ceramic ferrules which have a common axis with respect to the ferrule as well as diameters which exactly match the diameters of optical fibers to be inserted therein, the ceramic materials and the molds used for forming the ferrules are expensive.

Some ferrules are made of glass in an attempt to reduce the costs associated with their manufacture. Glass ferrules are made from glass rods within which a bore is formed. The bore is typically formed by drilling a hole in one end of the glass rod. However, most drilling processes are abrasive, forming cracks and chips along the length of the bore. Additionally, the drilling process tends to form ferrules with bores that are too large and in which the axis of the bore is not aligned with the axis of the ferrule, due to fluctuations in the drilling speed and/or drill-bit wobble during bore formation.

Thus, methods of making ferrules for use with optical fibers continue to be sought.

SUMMARY OF THE INVENTION

The present invention is directed to a method for controlling a bore diameter of an optical fiber ferrule. The diameter of the bore is controlled by collapsing the ferrule around a rod inserted in an over-sized bore formed therein. The term over-sized bore as used in this disclosure means that the bore has a diameter larger than the diameter of an optical fiber to be supported by the ferrule. The diameter of the rod is selected to match the diameter of the optical fiber to be supported by the ferrule. Thus, after the rod is subsequently removed from the ferrule, the ferrule has a bore diameter which is defined by the diameter of the rod.

In the present invention, a ferrule having a bore extending axially therethrough is provided. The bore has an over-sized diameter. It is desirable for the diameter of the over-sized bore to be no more than about 25% larger than the diameter of the rod inserted therein. Bore diameters that are more than about 25% larger than the diameter of a rod inserted therein are undesirable because the outer dimensions of the ferrule are potentially reduced when the ferrule collapses around the rod. Additionally, the diameter of the over-sized bore should be large enough so the axis of the rod inserted therein can be aligned with the axis of the ferrule.

A rod is at least partially inserted in the over-sized bore. The rod is selected to have a diameter that matches the diameter of the optical fiber to be supported by the ferrule. The axis of the rod is aligned with the axis of the ferrule. Because of this alignment, the axis of the ferrule and the axis of the reduced diameter bore are aligned when the ferrule collapses around the rod. Alignment of the axes for the ferrule and the reduced diameter bore is desirable, since such alignment limits coupling losses between the optical fiber supported therein and other optical devices.

The rod is made of a material that has a coefficient of thermal expansion that is greater than a coefficient of thermal expansion for the ferrule. It is important that the rod have a coefficient of thermal expansion that is greater than the coefficient of thermal expansion for the ferrule, so the rod can be removed from the reduced diameter bore after the ferrule collapses therearound. Glass is one example of a suitable ferrule material. Materials that have coefficients of thermal expansion greater than the coefficient of thermal expansion for many glass ferrules include metals. An example of a suitable metal includes stainless steel.

After the rod is at least partially inserted in the over-sized bore, the ferrule is rotated around its axis. The ferrule is rotated at a speed of less than about 100 revolutions per minute. Speeds greater than 100 revolutions per minute are undesirable because the ferrule potentially wobbles. Wobbling of the ferrule causes the rod, the over-sized bore, and the ferrule to lose their axial alignment and consequently, the axis of the reduced diameter bore will not be the same as the axis of the ferrule. The rod is rotated in the same direction and at the same speed as the ferrule.

As the ferrule and the rod rotate, the end of the ferrule wherein the rod is inserted is heated. Heating the end of the ferrule wherein the rod is inserted, collapses it around the rod. When the ferrule collapses around the rod, the ferrule has a bore diameter which is defined by the diameter of the rod.

The ferrule is heated using conventional methods such as a laser (e.g., $CO_2$ laser). The laser heats the ferrule collapsing it around the rod without affecting other dimensions of the ferrule (e.g., outer diameter). The laser is preferably operated at an output power of less than about 25 watts. Additionally, the laser preferably emits laser beams having a beam width less than about 250 μm. It is desirable for the laser beams to be focused at a point on the surface of the ferrule that is less than about 200 μm from the over-sized bore. Focusing the laser beam at a point in the ferrule that is less than about 200 μm from the over-sized bore, heats the ferrule so it collapses around the rod without affecting the outer diameter of the ferrule. An example of a laser suitable for heating the ferrule is a carbon dioxide ($CO_2$) laser.

The laser optionally functions in a pulsed-mode. In the pulsed-mode, the laser periodically emits light pulses. The light pulses heat the ferrule, collapsing it around the rod. The pulsed-mode laser is preferably operated using the same output power, beam width, and focusing depth discussed above for the non-pulsed-mode laser.

In one embodiment of the present invention, the position of the laser beam along the axis of the ferrule changes during the heating step. The laser beam and/or the ferrule change position relative to one another with a speed less than about 10 mm/s (millimeters/second). Changing the position of the laser beam along the axis of the ferrule with speeds greater than 10 mm/s heats the ferrule unevenly, only partially collapsing it around the rod.

After the ferrule is collapsed around the rod, the rod is removed from the ferrule. The rod is removed from the ferrule by contracting it. The rod is contracted prior to its removal. Cooling is an example of a suitable expedient for contracting the rod. Since the rod has a coefficient of thermal expansion that is greater than the coefficient of expansion for the ferrule, the rod contracts relative to the ferrule when the rod is cooled.

The rod is cooled using rapid cooling methods such as immersing it in liquid nitrogen. In this embodiment, only the portion of the rod not in the bore of the ferrule is immersed in the liquid nitrogen, so the ferrule does not contract substantially.

Other objects or features of the present invention will become apparent from the following detailed description considered in conjunction with the accompanying drawings. It is to be understood, however, that the drawings are designed solely for purposes of illustration and do not serve to limit the invention, for which reference should be made to the appended claims.

DETAILED DESCRIPTION

The present invention is directed to a method for controlling a bore diameter of an optical fiber ferrule. The diameter of the bore is controlled by collapsing the ferrule around a rod inserted in an over-sized bore formed therein. Thus, after the rod is subsequently removed from the ferrule, the ferrule has a bore diameter which is defined by the diameter of the rod.

Figure 1A:
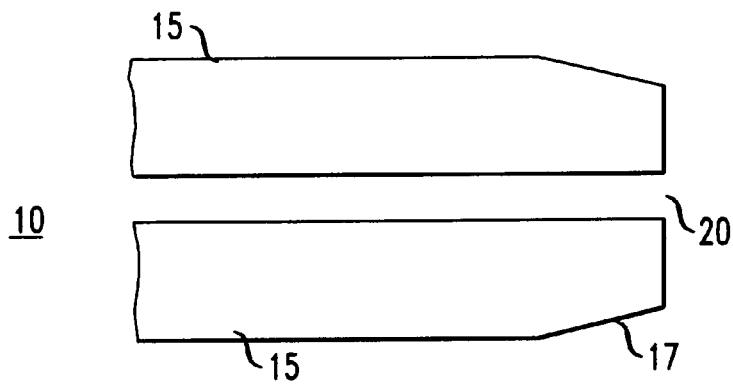
FIG. 1A shows a cut away view of an optical fiber ferrule typically used for supporting an end of an optical fiber.
Figure 1B:
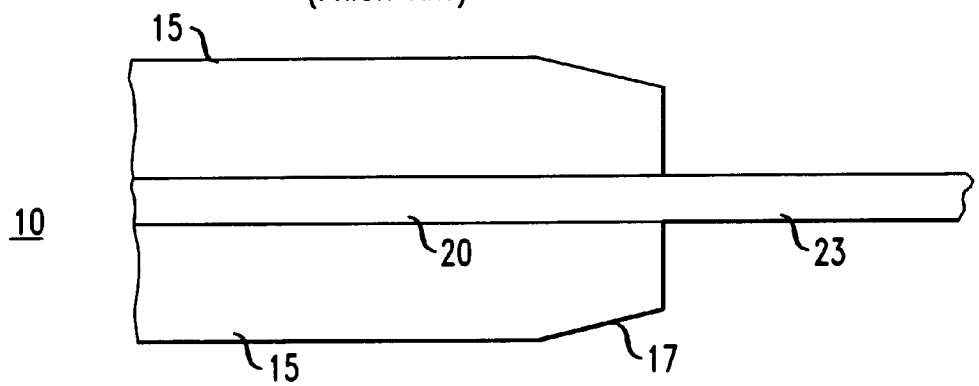
FIG. 1B depicts a cut away view of an optical fiber protruding from a beveled end of the optical fiber ferrule shown in FIG. 1A.
Figure 1C:
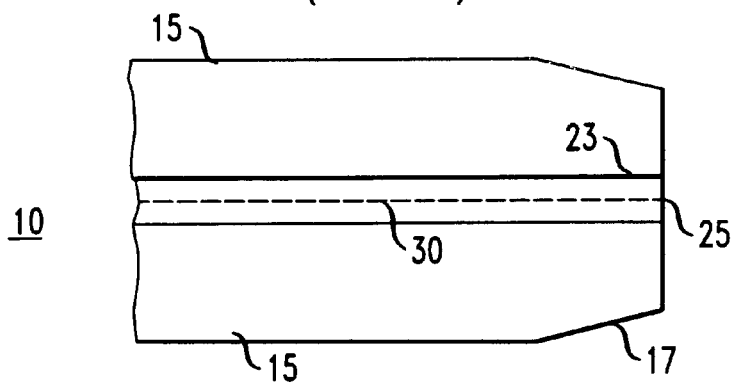
FIG. 1C shows a cut away view of a flat end face on the optical fiber of FIG. 1B that is flush with the beveled end of the optical fiber ferrule.
Figure 2:
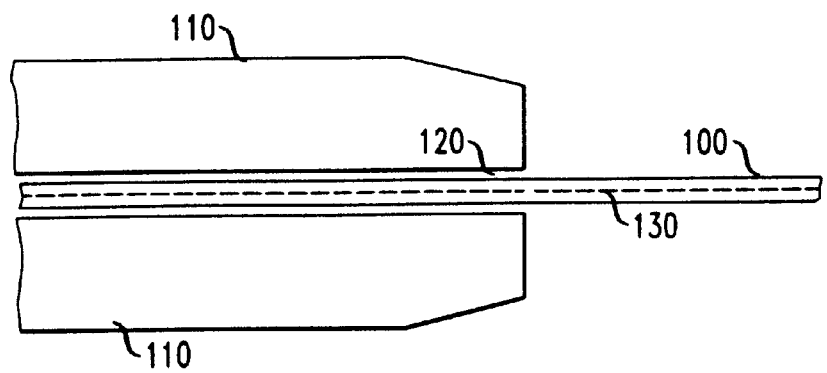
FIG. 2 shows a cut away view of a rod at least partially inserted in an over-sized diameter bore of an optical fiber ferrule.

In the present invention, an optical fiber ferrule 110 having a bore 120 extending axially therethrough is provided as shown in the cut away view of FIG. 2. The bore 120 has an over-sized diameter, which means its diameter is larger than the diameter of an optical fiber to be supported in the ferrule 110.

The diameter of the over-sized bore 120 is preferably no more than about 25% larger than the diameter of a rod to be inserted therein. Bore diameters that are more than about 25% larger than the diameter of the rod to be inserted therein are undesirable because the outer dimensions of the ferrule 110 are potentially reduced when the ferrule collapses around the rod. Additionally, the diameter of the over-sized bore 120 should be large enough so the axis of the rod inserted therein can be aligned with the axis of the ferrule.

A rod 100 is at least partially inserted in the over-sized bore 120 of the ferrule 110, as shown in FIG. 2. The rod 100 is selected to have a diameter which matches the diameter of the optical fiber (not shown) that is to be supported by the ferrule 110.

The axis 130 of the rod 100 is aligned to the axis of ferrule 110, also denoted as 130. Because of this alignment, the axis of the ferrule 130 and the axis of the reduced diameter bore are aligned when the ferrule 110 collapses around the rod 100. Alignment of the axes for the ferrule and the reduced diameter bore is desirable, since such alignment limits coupling losses between the optical fiber supported therein and other optical devices.

The rod 100 is made of a material that has a coefficient of thermal expansion which is greater than a coefficient of thermal expansion for the ferrule 110. This difference in the coefficients of thermal expansion for the material of the ferrule 110 and the material of the rod 100, facilitates removal of the rod 100 from the ferrule 110 after the ferrule 110 collapses around the rod.

Glass is one example of a suitable ferrule material. Suitable glasses include Pyrex glass commercially available from Corning Company. Materials that have coefficients of thermal expansion greater than the coefficient of thermal expansion for many glass ferrules include metals. One example of a suitable metal includes stainless steel. For example, when the ferrule is made of glass which has a coefficient of thermal expansion of about $7.0 \times 10^{-6} (°C)^{-1}$, a suitable rod material is stainless steel that has a coefficient of thermal expansion of about $16 \times 10^{-6} (°C)^{-1}$.

Figure 3:
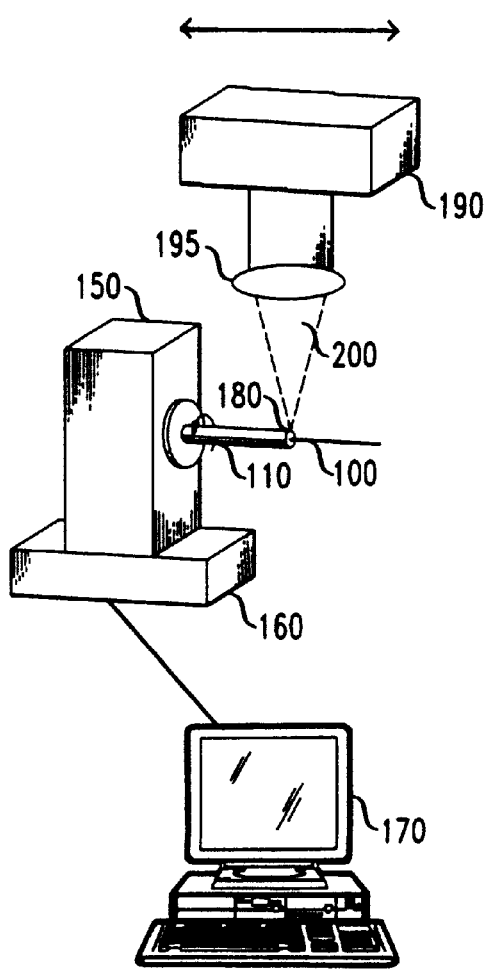
FIG. 3 illustrates the method of the present invention wherein the optical fiber ferrule rotates while being heated, collapsing it around the rod.

The rod 100 is at least partially inserted in the over-sized bore (not shown) of the ferrule 110 and their axes aligned using an arrangement, such as the arrangement shown in FIG. 3. FIG. 3 shows the ferrule 110 mounted in a motorized chuck 150. The rod 100 is mounted in a stationary chuck 155.

The motorized chuck 150 and the stationary chuck 155 are affixed to an X-Y-Z translation stage 160. A computer 170 controls the movement of the X-Y-Z translation stage 160. The X-Y-Z translation stage 160 under the control of computer 170, position the rod 100 and the ferrule 110 relative to each other so the axis of the rod 100 is aligned with the axis of the ferrule 110.

After the rod is at least partially inserted in the over-sized bore (not shown) and the rod and ferrule axes aligned, the ferrule is rotated around its longitudinal axis. As depicted in FIG. 3, the ferrule 110 rotates along with the rod 100. The motorized chuck 150 preferably rotates the ferrule 110 and the rod 100 with a speed less than about 100 revolutions per minute. Rotating the ferrule 110 at speeds greater than 100 revolutions per minute is undesirable because the ferrule 110 potentially wobbles. Wobbling of the ferrule 110 causes the rod 100, the over-sized bore 130, and the ferrule 110 to lose their axial alignment and consequently, the axis of the reduced diameter bore will not be the same as the of the ferrule.

The rod 100 is optionally mounted in a motorized chuck (not shown). When the rod 100 is mounted in a motorized chuck, the rod and the ferrule are rotated in the same direction, at about the same speeds.

As the ferrule and the rod rotate, the end of the ferrule 110 wherein the rod 100 is inserted, denoted as 180 in FIG. 3, is heated. Heating the end 180 of the ferrule 110 wherein the rod 100 is inserted, collapses the ferrule around the rod. When the ferrule collapses around the rod, the resulting bore has the same diameter as the rod.

The ferrule 110 is heated using conventional methods such as a laser 190. Using focusing optics 195, laser 190 focuses a laser beam 200 at a point in the ferrule that is less than about 200 $\mu$m away from the over-sized bore 130. Focusing the laser beam 200 at a point in the ferrule 110 that is less than about 200 $\mu$m away from the over-sized bore (not shown), heats the ferrule 110 so it collapses around the rod 100 without affecting the outer diameter of the ferrule.

The laser 190 operates at an output power less than about 25 watts. Additionally, the laser 190 preferably has a laser beam 200 width less than about 250 $\mu$m (micrometers). Such a laser output power and beam width heats the ferrule so it collapses around the rod without affecting other dimensions (e.g., outer diameter) of the ferrule. An example of a laser suitable for heating the ferrule is a carbon dioxide ($CO_2$) laser.

The laser optionally functions in a pulsed-mode. In the pulsed-mode, the laser 190 periodically emits light pulses. The light pulses heat the ferrule, collapsing it around the rod. The pulsed-mode laser is preferably operated using the same output power, beam width, and focusing depth discussed above for the non-pulsed-mode laser. Additionally, the pulsed-mode light pulses are emitted at a frequency of at least 90 Hz (hertz). Emitting the pulsed-mode light pulses at frequencies less than about 90 Hz heats the ferrule excessively potentially affecting the outer dimensions thereof. For example, a pulse rate for the laser of about 75 Hz heats the ferrule so it attains a temperature of about 750° C. which is sufficient to melt many glass ferrules causing the outer dimensions of such ferrules to deform.

In one embodiment of the present invention, the position of the laser 190 beam along the axis of the ferrule 110 changes during the heating step. The position of the laser 190 beam changes along the axis of the ferrule 110 with a speed less than about 10 mm/s (millimeters/second). Changing the position of the laser 190 beam along the axis of the ferrule 110 with speeds greater than 10 mm/s heats the ferrule unevenly, only partially collapsing it around the rod 100.

After the ferrule is collapsed around the rod, the rod is removed from the ferrule. The rod is removed from the ferrule by contracting it. The rod is contracted prior to its removal. Cooling is an example of a suitable expedient for contracting the rod. Since the rod has a coefficient of thermal expansion that is greater than the coefficient of expansion for the ferrule, the rod contracts relative to the ferrule when the rod is cooled.

Figure 4:
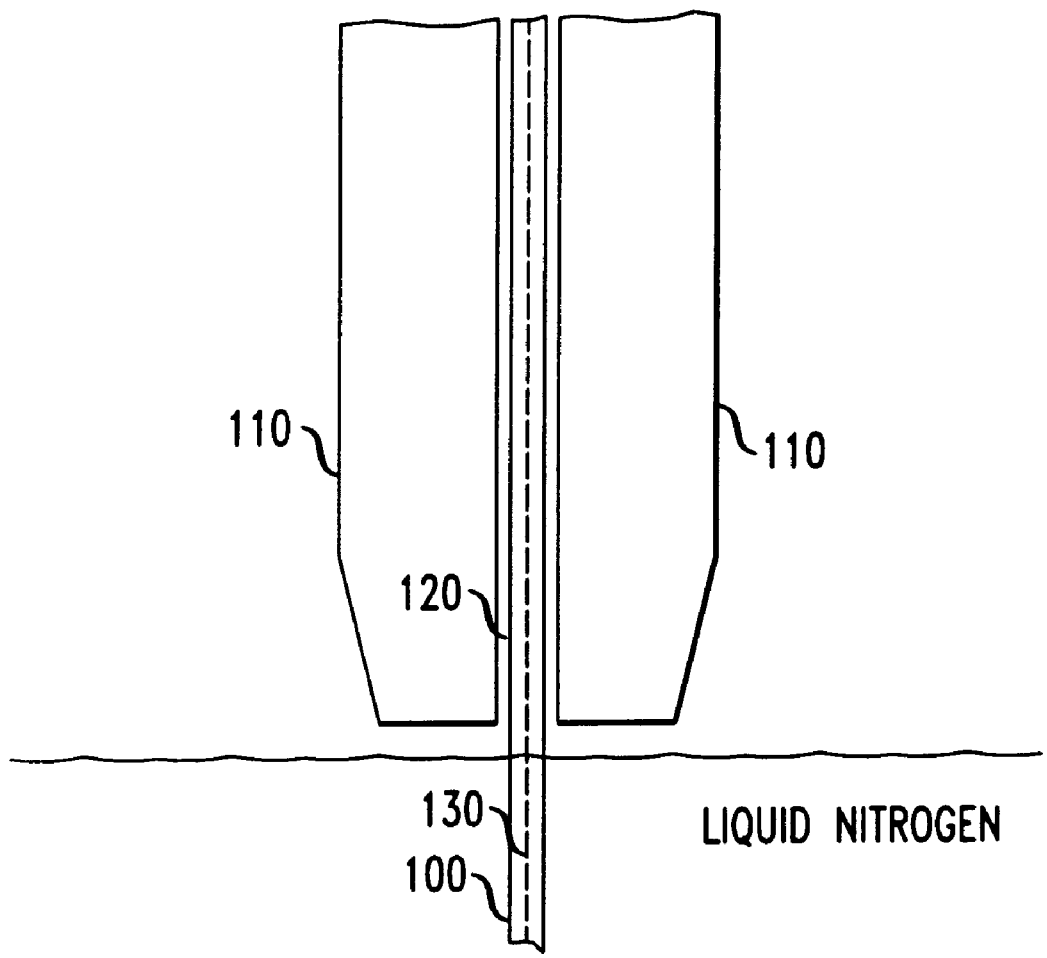
FIG. 4 shows a cut away view of the portion of the rod not inserted in an optical fiber bore immersed in liquid nitrogen.

The rod is cooled using rapid cooling methods such as immersing it in liquid nitrogen. In this embodiment only the portion of the rod not in the bore of the ferrule is immersed in the liquid nitrogen, so the ferrule does not contract substantially as the rod contracts, preventing the rod from being removed therefrom. See, e.g., FIG. 4.

The following examples are provided to illustrate specific embodiments of the present invention.

EXAMPLE 1

A 1.25 mm (millimeter) diameter ferrule was cut from glass ferrule stock with a saw. The glass ferrule was cut to a length of about 6.4 mm. The glass ferrule had a bore extending axially therethrough with a diameter of about 130 $\mu$m. The glass ferrule stock was made of Pyrex glass.

One end of the cut glass ferrule was loaded into a lathe head. The lathe head was mounted on an X-Y-Z translation stage. A 125 $\mu$m diameter steel wire was loaded in a chuck. The chuck was mounted on an X-Y-Z translation stage. The 125 $\mu$m diameter steel wire was partially inserted into the 130 $\mu$m diameter bore of the cut glass ferrule. The axis of the 125 $\mu$m steel wire was positioned along the axis of the bore diameter using the X-Y-Z translation stages. The lathe head rotated the ferrule at a speed of about 50 rpm.

A pulsed-mode $CO_2$ laser heated the end of the cut glass ferrule collapsing it around the 125 $\mu$m diameter steel wire. The pulsed-mode $CO_2$ laser was operated with an output power of about 20 watts. The pulsed-beam was focused at a point in the cut glass ferrule about 150 $\mu$m above the 130 $\mu$m diameter bore. The pulsed-mode $CO_2$ laser was pulsed at a frequency of about 200 Hz and had a beam width of about 200 $\mu$m.

After the ferrule collapsed around the 125 $\mu$m diameter steel wire, the steel wire was removed therefrom by immersing the portion of the steel wire not in the ferrule in liquid nitrogen for about 30 seconds. The liquid nitrogen contracted the steel wire relative to the 125 $\mu$m diameter bore, and the steel wire was pulled therefrom.

EXAMPLE 2

A 1.25 mm diameter glass ferrule was cut and loaded in a lathe head according to the conditions of Example 1. A 125 $\mu$m steel wire was partially inserted in a bore thereof and positioned as described in Example 1. The glass ferrule was rotated at a speed of about 50 rpm.

A pulsed-mode $CO_2$ laser heated the end of the cut glass ferrule collapsing it around the 125 $\mu$m diameter steel wire. The pulsed-mode $CO_2$ laser was operated with an output power of about 20 watts. The pulsed-beam was focused at a point in the cut glass ferrule about 150 $\mu$m above the 130 $\mu$m diameter bore. The pulsed-mode $CO_2$ laser was pulsed at a frequency of about 200 Hz and had a beam width of about 50 $\mu$m. As the ferrule was heated, the ferrule was moved axially relative to the pulsed-mode $CO_2$ laser using the X-Y-Z translation stage. The X-Y-Z translation stage moved the cut glass ferrule axially relative to the pulsed-mode $CO_2$ laser at a speed of about 1 mm/second.

After the ferrule collapsed around the 125 $\mu$m diameter steel wire, the steel wire was removed therefrom as described in Example 1.

The invention claimed is:

1. A method for fabricating an optical fiber ferrule, comprising the steps of:

providing a optical fiber ferrule with a bore extending axially therethrough, wherein the bore has a first diameter;

inserting a rod at least partially into a first end of the bore, wherein the rod has a second diameter that is less than the first diameter and wherein the rod is inserted so that the axis of the rod is aligned to the axis of the bore;

rotating the optical fiber ferrule;

heating the optical fiber ferrule to collapse the ferrule around the rod;

contracting the rod by immersing a portion of the rod not in the bore in liquid nitrogen; and removing the rod from the optical fiber ferrule.

2. The method of claim 1 further comprising rotating the rod along with the optical fiber ferrule.

3. The method of claim 2 wherein both the optical fiber ferrule and the rod are rotated in the same direction with about the same speed.

4. The method of claim 2 wherein the rod is rotated at a rate of less than about 100 revolutions per minute.

5. The method of claim 1 wherein the optical fiber ferrule is rotated at a rate of less than about 100 revolutions per minute.

6. The method of claim 1 wherein the second diameter is smaller than the first diameter by an amount that is 25% or less of the first diameter.

7. The method of claim 1 wherein the optical fiber ferrule is heated by contacting the optical fiber ferrule with a laser beam.

8. The method of claim 7 wherein the laser beam has a diameter less than about 250 microns.

9. The method of claim 7 wherein the laser beam has an area of contact with the optical fiber ferrule and wherein the area of contact is varied by varying the position of the laser along the axis of the optical fiber ferrule.

10. The method of claim 9 wherein the laser changes position along the axis of the optical fiber ferrule with a speed less than about 10 millimeters/second.

11. The method of claim 7 wherein the laser is operated in a pulsed-mode.

12. The method of claim 11 wherein the laser beam has a diameter less than about 50 microns.

13. The method of claim 11 wherein the laser is operated at a frequency greater than about 90 hertz.

14. The method of claim 7 wherein the laser is a carbon dioxide ($CO_2$) laser.

15. The method of claim 1 wherein the optical fiber ferrule is made of glass.

16. The method of claim 1 wherein the rod is made of metal.

17. The method of claim 16 wherein the metal is steel.

* * * * *